Sept. 4, 1923. 1,466,807
M. PHELPS
COMPUTING ATTACHMENT FOR SCALES
Filed Aug. 31, 1921 6 Sheets-Sheet 1

Sept. 4, 1923.

M. PHELPS

COMPUTING ATTACHMENT FOR SCALES

Filed Aug. 31, 1921          6 Sheets-Sheet 3

1,466,807

INVENTOR
McKINNEY PHELPS
BY Herman Miller
ATTORNEY.

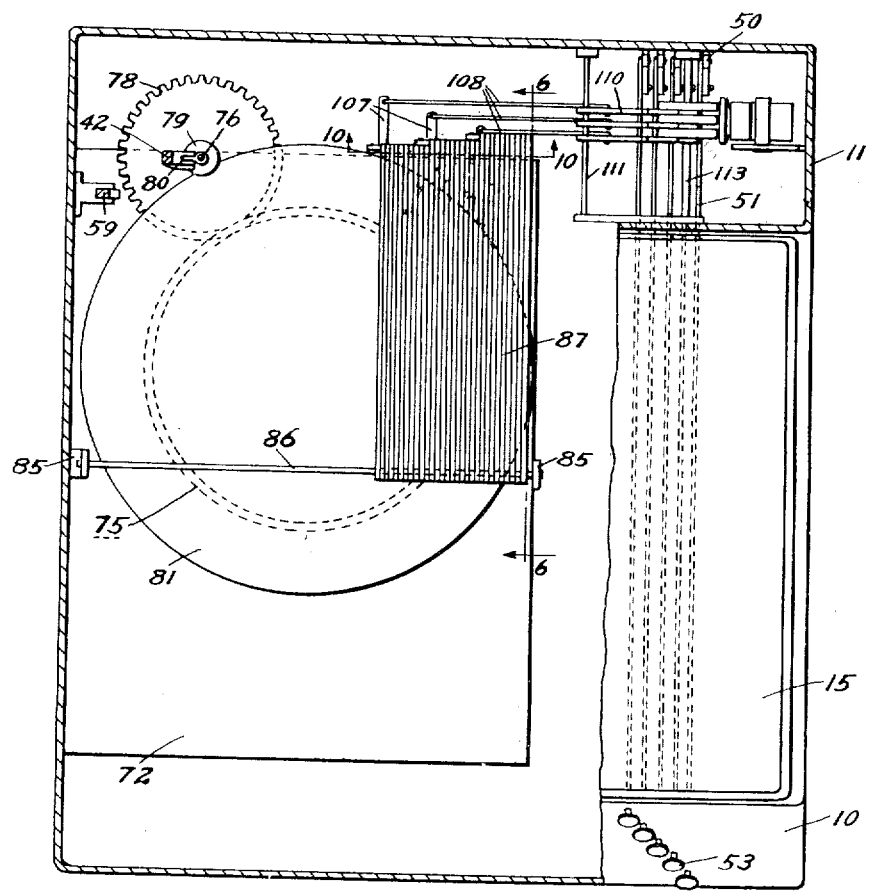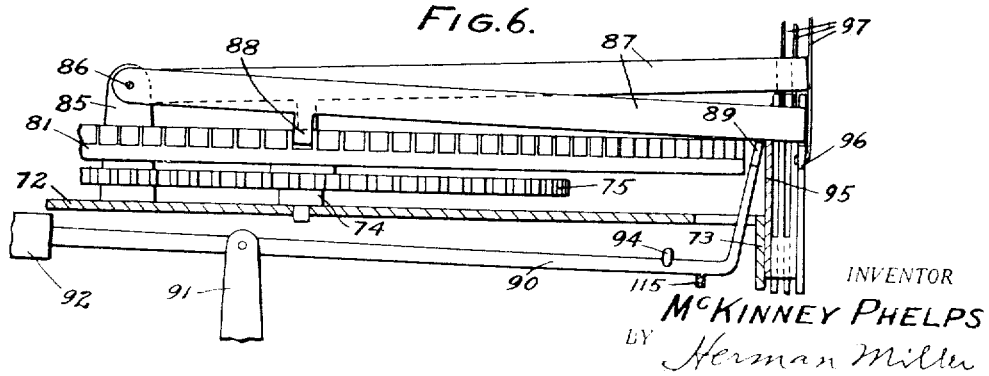

Sept. 4, 1923.

M. PHELPS 1,466,807

COMPUTING ATTACHMENT FOR SCALES

Filed Aug. 31, 1921    6 Sheets-Sheet 5

INVENTOR
McKINNEY PHELPS
BY Herman Miller

ATTORNEY.

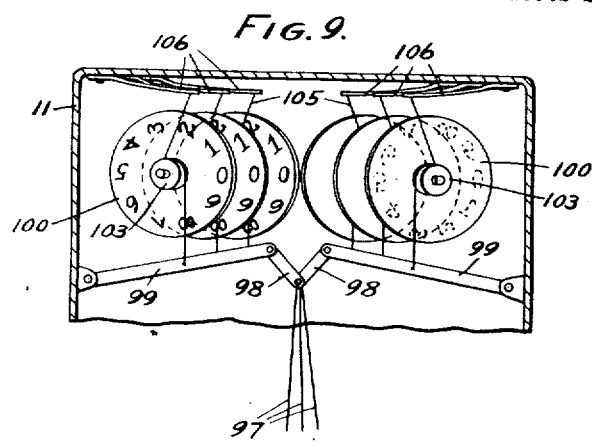
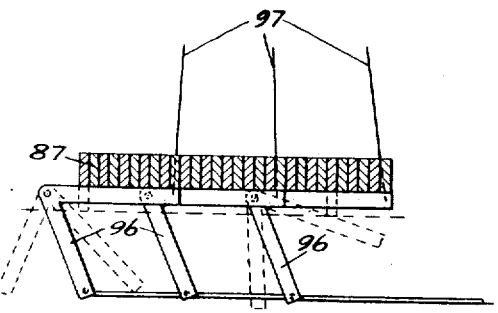
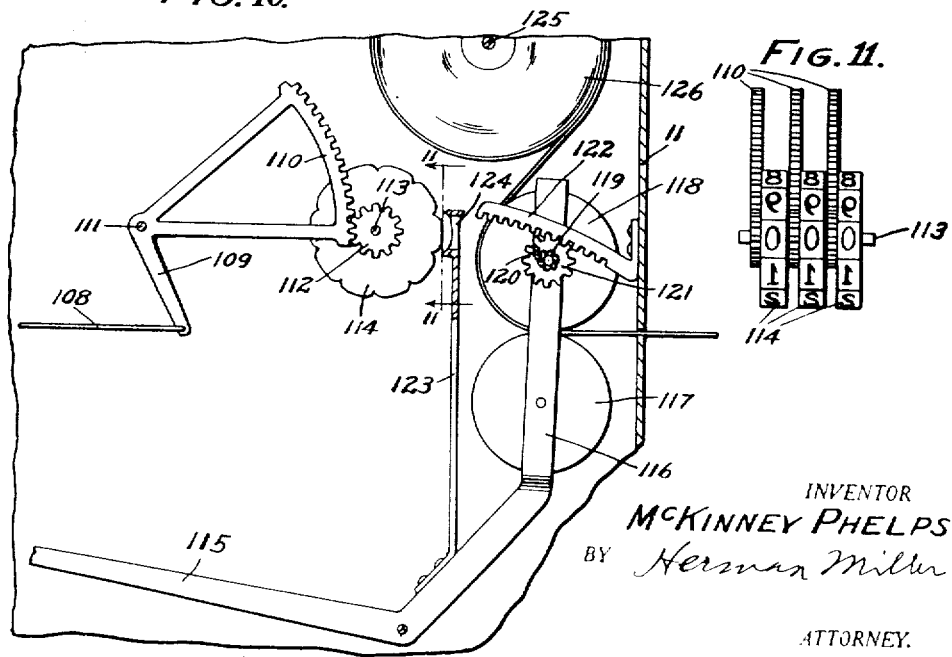

Patented Sept. 4, 1923.

1,466,807

UNITED STATES PATENT OFFICE.

McKINNEY PHELPS, OF REDLANDS, CALIFORNIA.

COMPUTING ATTACHMENT FOR SCALES.

Application filed August 31, 1921. Serial No. 497,313.

*To all whom it may concern:*

Be it known that I, McKINNEY PHELPS, a citizen of the United States, residing at Redlands, in the county of San Bernardino and State of California, have invented new and useful Improvements in Computing Attachments for Scales, of which the following is a specification.

My invention relates to a computing attachment for scales, the principal objects of my invention being to combine with a scale, of the type such as is ordinarily used upon counters for weighing various commodities, a relatively simple and practical computing mechanism that will be effective in indicating the exact selling price of the commodity placed upon the scale platform; and further to provide in a machine of the character described simple and efficient means for printing the total amount of the transaction upon a slip of paper or thin cardboard, and which latter may be delivered to the purchaser, or used by the merchant in the keeping of his records relating to weighing and selling transactions.

A further object of my invention is to provide simple and efficient means for accurately weighing various articles or products that are sold at different prices per pound, and for mechanically calculating the amounts to be charged for the differently priced goods or products.

With the foregoing and other objects in view, my invention consists in certain noval features of construction and arrangement of parts that will be hereinafter more fully described and claimed and illustrated in the accompanying drawings, in which:

Fig. 5 is a horizontal section taken approximately on the line 5—5 of Fig. 4.

Fig. 6 is an enlarged detail section taken approximately on the line 6—6 of Fig. 5.

Fig. 9 is an enlarged vertical section taken approximately on the line 9—9 of Fig. 2.

Fig. 10 is an enlarged cross section taken approximately on the line 10—10 of Fig. 5.

Fig. 11 is a detail elevational view of the parts seen looking in the direction indicated by the arrows 11—11 of Fig. 10.

Figure 1:
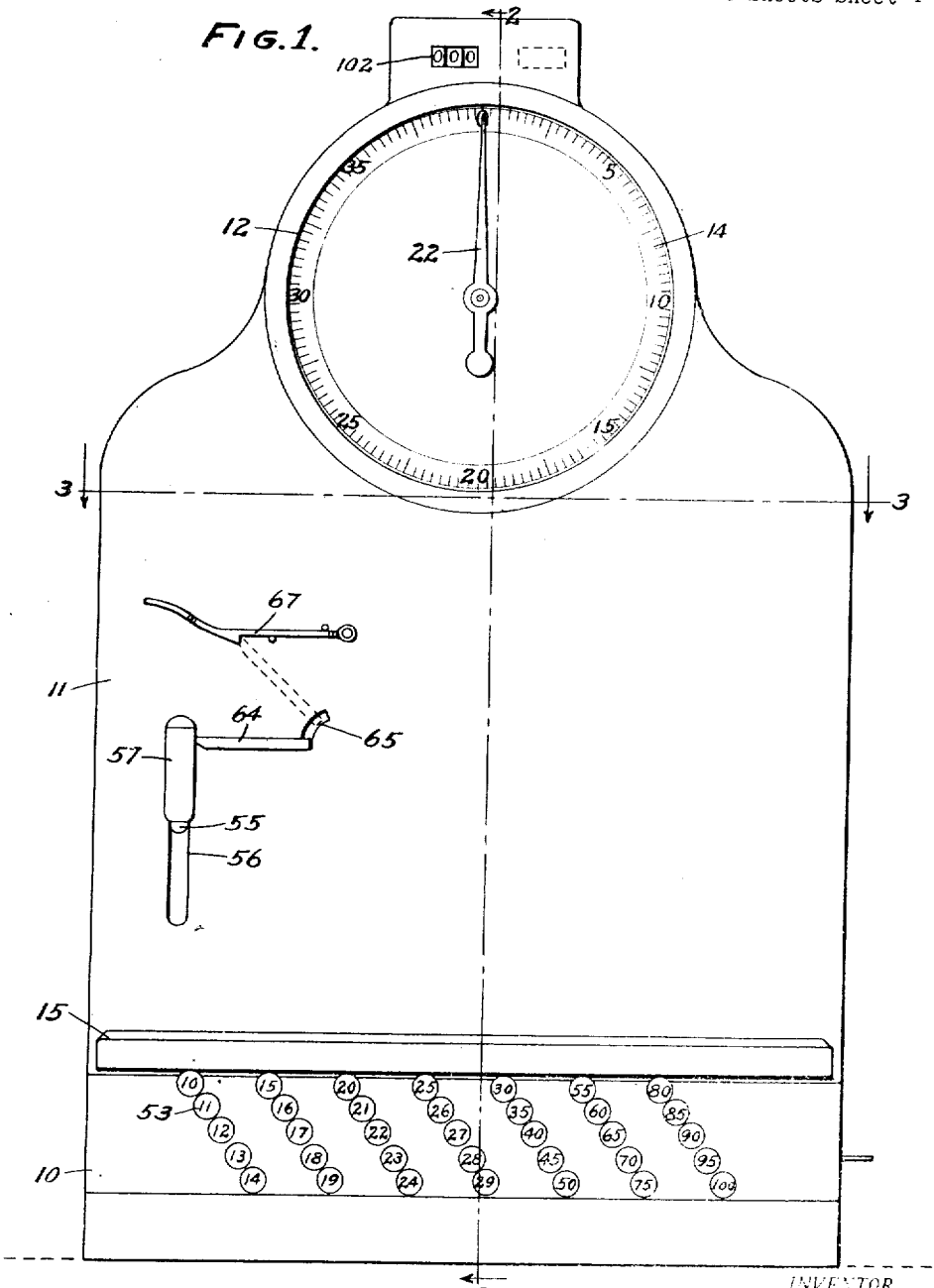
Figure 1 is a front elevational view of a computing scale of my improved construction.
Figure 2:
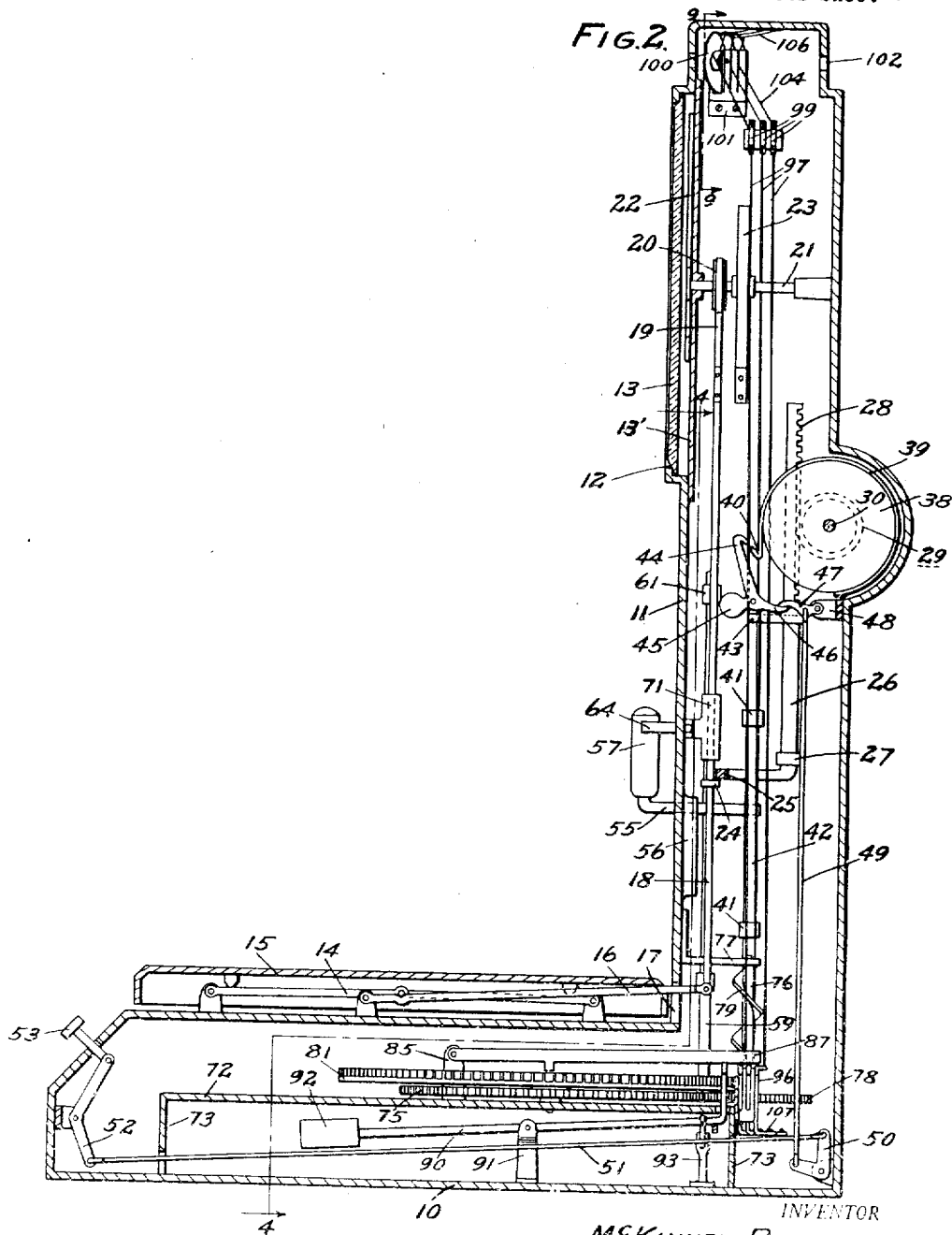
Fig. 2 is a vertical section taken on the line 2—2 of Fig. 1.
Figure 3:
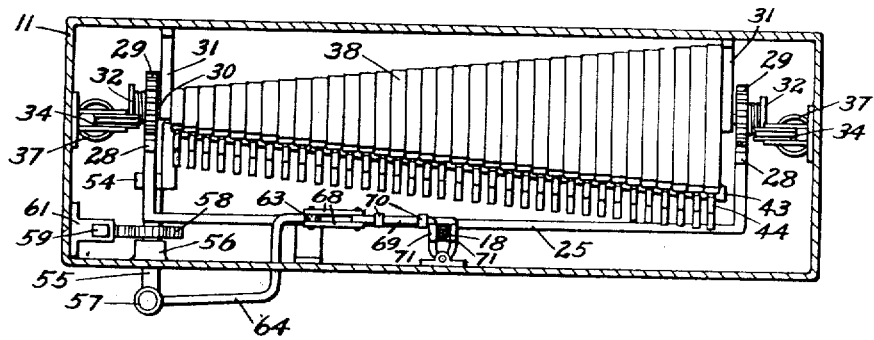
Fig. 3 is a horizontal section taken on the line 3—3 of Fig. 1.

Referring by numerals to the accompanying drawings which illustrate a practical embodiment of my invention, 10 designates a horizontally disposed base housing of the computing scale, and 11 a housing that projects upwardly from the rear portion of said base housing. The chambers within these housings communicate with each other, and the combined housings contain practically all of the weighing and computing mechanism.

Formed in the upper portion of the front wall of housing 11 is a circular opening 12 that is preferably closed by section 13 of glass or the like, and arranged within said opening to the rear of the section of glass is a disc 13' on the front face of which is arranged a scale, the graduations of which are arranged and numbered so as to designate pounds. Supported on pivotally mounted scale beams 14 that are arranged on top of the housing 10 is a scale platform 15, and one of the beams or levers 16 that is positioned beneath said platform extends through an opening 17 that is formed in the lower portion of the front wall of housing 11, and the rear end of said beam or lever is pivotally connected to a vertically disposed rod 18.

The upper end of rod 18 is connected to a flexible metal tape 19 that is adapted to wind onto a small drum 20, and the latter being fixed on a shaft 21 that is journaled for rotation in suitable bearings, one of which is at the center of disc 14, and the forward end of said shaft carries a hand or pointer 22 that co-operates with the graduated scale on said disc for indicating the weight of the articles or products placed on the scale platform. Secured to the shaft 21 is the inner end of a spiral spring 23, the outer end of which is secured to a part of the housing 11, and which spring is effective in rotating shaft 21 to its normal position after the load has been removed from the scale platform.

Arranged on the lower portion of rod 18 is a collar 24 that serves as a stop to limit the downward movement of a transversely disposed bar 25, which latter extends across the lower portion of housing 11 and its ends being connected to vertically disposed bars 26 that are arranged for sliding movement in suitable bearings 27. The upper portions of the rear faces of these vertical bars 26 are provided with rack teeth 28 that mesh with the teeth of pinions 29, and which latter are secured to the end portions of a horizontally disposed shaft 30 that is journaled for rotation in suitable bearings 31.

Secured on the end portions of shaft 30 adjacent to pinions 29 are small drums 32 on which are arranged to wind cables 33 that pass upwardly from said drums over grooved pulleys 34 that are journaled in suitably located brackets 35, and the lower ends of said cables being provided with counterbalancing weights 36 that are arranged for movement in vertically disposed tubular members 37, and the latter being positioned adjacent to the side walls of housing 11. Secured to shaft 30 between the bearings 31 is a series of price-proportionate discs 38 that are graduated in size from one end of the series to the other, that is, the smallest disc is fixed on the left-hand end of shaft 30, and the succeeding discs toward the right-hand gradually increase in diameter, and which arrangement provides the disc of largest diameter on the right-hand end of the shaft.

Secured to the under side of each disc 38 is one end of a flexible band 39, preferably of metal, the same extending upwardly and forwardly approximately three-quarters of the distance around the circumference of the disc, and its opposite end being formed into an upturned hook 40 that normally occupies a position on the front side of the disc.

Arranged for sliding movement in bearings 41 that project inwardly from the side walls of housing 11 are vertically disposed bars 42, the upper ends of which are connected by cross bar 43, and pivotally mounted on said cross bar is a series of upwardly projecting hooks 44, and which latter are adapted to engage with the hooks 40, there being one hook 44 for each of said hooks 40. The lower portions of hooks 44 are provided with weights 45 that normally hold said hooks out of engagement with the hooks 40, and projecting inwardly from the lower portions of hooks 44 are fingers 46 that are adapted to be engaged by triggers 47, and which latter are pivotally connected to brackets 48 that project inwardly from the rear wall of housing 11.

Pivotally connected to each trigger 47 is the upper end of a pull rod 49, the lower end thereof being pivotally connected to a bell crank 50, the latter being pivoted in the lower rear corner between the bottom of housing 10 and rear wall of housing 11. Pivotally connected to the vertical arm of each bell crank 50 is the rear end of a rod 51 that extends forwardly through housing 10 and its forward end being pivotally connected to the short depending arm of a bell crank 52, and which latter is pivotally mounted in the forward portion of housing 10.

Pivotally connected to the upper and longer arm of each bell crank 52 is the lower end of a key or push button 53, and which latter is arranged for operation through an aperture in the front portion of housing 10. Obviously, the number of these keys or push buttons corresponds with the number of discs 38, and said keys or push buttons are preferably arranged in inclined rows, as illustrated in Fig. 1, and the front face of each button is provided with numerals representing the price per pound of the goods or products that are weighed upon the scale platform.

Formed on the intermediate portion of the left-hand rod 42 is a bearing 54 in which is journaled the rear end of a rock shaft 55 that extends outwardly through a vertically disposed slot 56 in the front wall of housing 11, and carried by the outer end of said rock shaft is a vertically disposed handle 57. Rock shaft 55 carries a toothed segment 58 that is adapted to mesh with the teeth 59 of a vertically disposed bar 60 that is arranged for vertical movement in bearings 61 that project inwardly from the left-hand side wall of housing 11.

Figure 4:
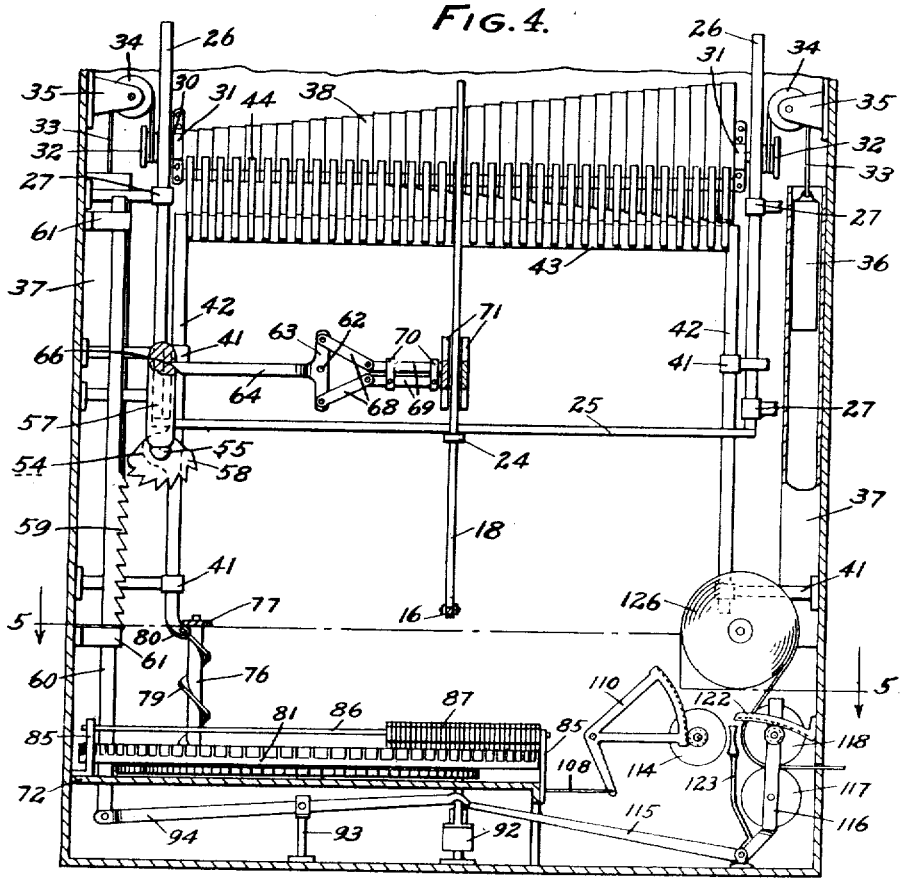
Fig. 4 is a vertical section taken on the line 4—4 of Fig. 2.

Pivotally mounted on a fixed pin or rod 62 within housing 11 a short distance to the right-hand of rock shaft 55 is a vertically disposed cross bar 63 with the central portion of which is formed integral the inner end of a horizontally disposed L-shaped arm 64 which latter projects through an arcuate slot 65 that is formed in the front wall of housing 11, and the end of the outer portion of this arm normally engages in a recess 66 that is formed in the upper portion of handle 57 (see Figs. 1 and 4).

Arranged in the front side of the front wall of housing 11 above the arcuate slot 65 is a spring catch 67 that is adapted to receive the end of arm 64 when the same is swung upwardly into an inclined position, as illustrated by dotted lines in Fig. 1.

Pivotally connected to the ends of cross bar 63 are the ends of links 68, the inner ends of which are pivotally connected to horizontally disposed sliding bars 69, one of which carries a pair of loops 70 that pass around the other bar, and secured to the ends of said bars 69 are clamping plates 71 that are positioned on opposite sides of the vertically movable bar 18.

Under normal conditions, or while arm 64 occupies a horizontal position as illustrated in Fig. 4; the parts 63, 68 and 69 are positioned so that clamping plates 71 are spaced apart and out of engagement with bar 18, and when arm 64 is swung into an inclined position, the parts 63, 68 and 69 will act to move plates 71 into clamping engagement with bar 18, thereby holding the same against vertical movement.

Arranged in the lower portion of housing 10 is a horizontally disposed plate 72 that is supported by end walls 73, and journaled for rotation near the center of said plate is a vertically disposed stud 74 that carries a gear wheel 75. Journaled in said plate 72 adjacent to the left-hand side thereof is the lower end of a vertically disposed shaft 76, the upper portion of which is journaled in the bracket 77, and fixed on the lower portion of said shaft is a pinion 78 that meshes with gear wheel 75. Formed on the upper portion of shaft 76 is a spirally disposed flange 79 that is engaged by the bifurcated lower end 80 of the vertical bar 42 that is provided with the bearing 54. By virtue of the construction just described, the vertical movement of the bar 42 having the bifurcated lower end, will impart rotary motion to shaft 76, and through pinion 78 gear wheel 75 and stud 74 will be rotated.

Figure 7:
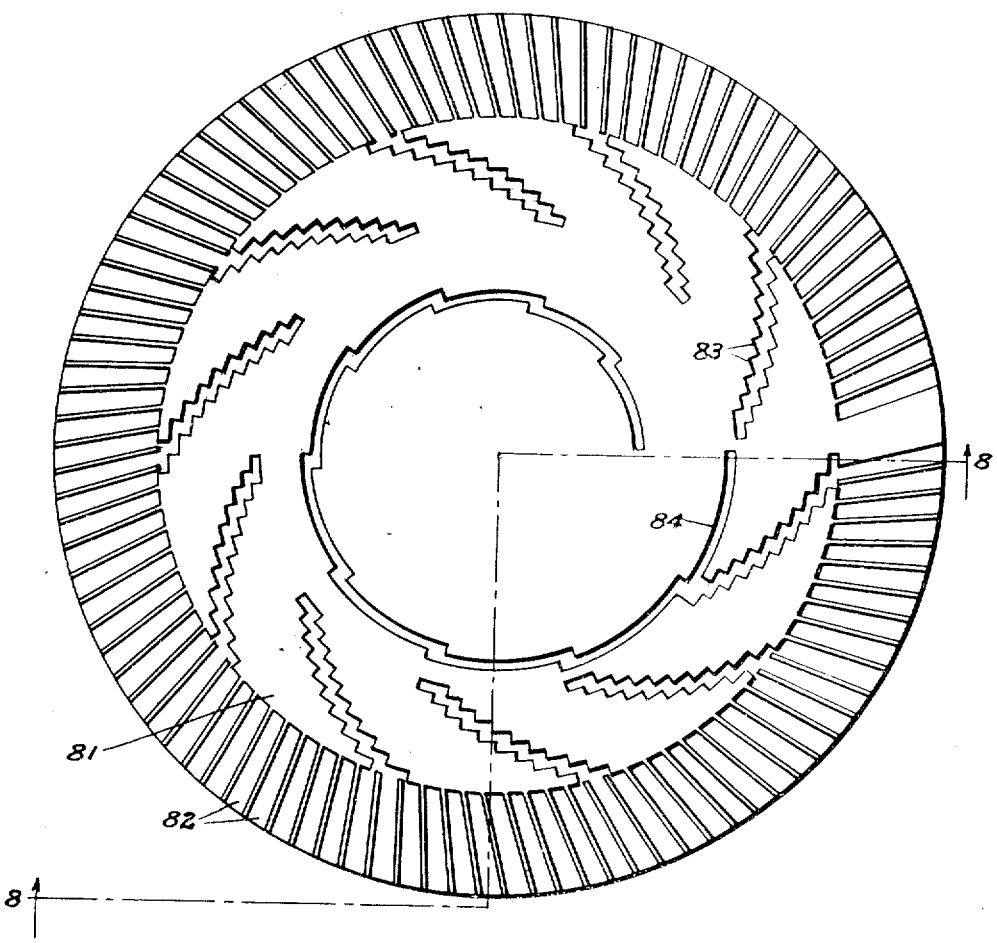
Fig. 7 is a plan view of a notched and slotted disc that is utilized in my improved computing scale for positioning certain of the levers therein.
Figure 8:
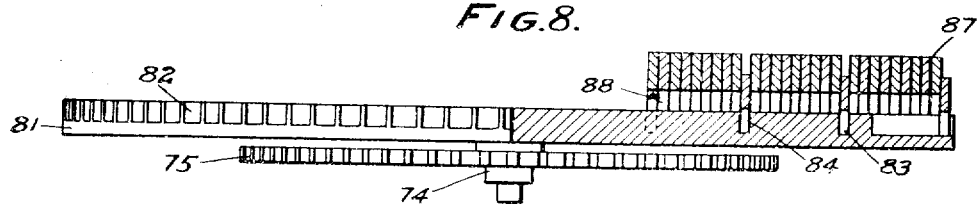
Fig. 8 is a sectional view taken approximately on the line 8—8 of Fig. 7, and showing in section the levers that are associated with the slotted and notched disc.

Secured to the upper end of stud 74 is a disc 81, the upper surface of which is provided with three sets of slots or recesses arranged as illustrated in Fig. 7. The slots 82 of the outer row, or that row that is immediately adjacent to the edge of the disc, are slightly inclined with respect to lines radiating from the axis of the disc, and the next adjacent or intermediate slots 83 are each formed by a series of ten substantially rectangular recesses that are disposed in step formation, thereby forming arcuate slots that extend inwardly from the inner ends of the slots 82. The length of each arcuate slot 83 equals ten of the slots 82, and the connected recesses which form said slots 83 correspond with ten of the slots 82 of the outer row. The inner series of slots or recesses 84 are formed so that their ends communicate with each other, and said slots or recesses being arranged in offset or step formation, thereby forming a substantially continuous spirally disposed groove on the face of the disc within the arcuate slots 83. Each section of this spirally disposed inner slot corresponds with one of the slots or recesses 83 and with ten of the outer series of slots or recesses 82.

Overlying disc 81 and supported in suitable bearings 85 is a rod 86, and pivotally secured thereto are the rear ends of a series of horizontally disposed bars 87 which overlie the area of the disc 81 that is covered by the slots 82, 83 and 84, and depending from these bars 87 are substantially rectangular lugs 88 that are adapted to drop into the slots 82, 83 and 84 when the disc is rotated during a weighing and calculating operation. These bars 87 are arranged in three sets with ten bars in each set, the same representing units, tens and hundreds, and the length of the intermediate set of bars, or those representing tens, is slightly greater than the length of the set representing hundreds, and the outer set, or that set representing units is slightly greater in length than the intermediate set, or that set representing tens.

Transversely arranged beneath the rear portions of the bars 87 is a common lifting bar 89 that normally holds bars 87 out of contact with the disc 81 and that is carried by the rear end of a horizontally disposed arm 90, and the latter being fulcrumed on a bracket 91 that projects upwardly from the bottom of housing 10. The forward end of this arm 90 is provided with a weight 92 which normally tends to swing the rear end of arm 90 carrying the lifting bar 89 upwardly. Fulcrumed on a bracket 93 that projects upwardly from the bottom of housing 10 is a horizontally disposed arm 94, the free end of which bears on top of arm 90 adjacent to its rear end, and the rear end of said arm 94 is pivotally connected to the lower end of the vertically moving bar 60.

Fulcrumed on a plate 95 that projects upwardly from the rear one of the standards 73 is a series of three bell cranks 96, the same being spaced apart or offset from each other so that the horizontally disposed arm of each bell crank lies immediately beneath one of the sets or series of the arms 87. Thus the horizontal arm of one of the bell cranks is positioned beneath the rear ends of the longer series of arms, and which represent units, the horizontal arm of the intermediate bell crank being positioned beneath the rear ends of the intermediate set of arms and which represent tens, and the horizontal arm of the third bell crank being disposed immediately beneath the rear ends of the shorter series of arms and which represent hundreds.

Secured to the outer ends of the horizontal arms of the bell cranks 96 are the lower ends of flexible members 97, which latter extend upwardly through housing 11, and the upper ends of said flexible members being secured to the lower ends of a corresponding series of links 98, the upper ends of which are pivotally connected to a corresponding series of arms 99, the outer ends of which are pivotally connected to the side walls of the upper portion of housing 11.

Arranged immediately above each series of links 99 is a set of three discs 100, the latter being mounted for independent rotation in suitable bearings 101, and the members of each set of discs being offset from each other so that the numbers appearing on the faces of the discs will appear in proper order when viewed through openings, such as 102, that are formed in the front and rear walls of the upper portion of housing 11.

By utilizing two sets of the numbered discs 11, the total amount of each transaction may be readily observed by the salesman positioned to the rear of the computing scale, and likewise by the customer positioned in front or on the opposite side of the scale. Each disc 100 is provided on its axis with a small drum 103, and secured thereto and adapted to mount thereupon is a flexible member 104 that extends downwardly and is secured to the corresponding lever 99.

For the purpose of returning all of the discs to zero indicating positions, flexible members 105 are secured to the drums 103, and the upper ends of said flexible members being secured to flat springs 106 that are fixed to the top of the housing 11.

Secured to arms 107 that project outwardly from the bell cranks 96 are horizontally disposed rods 108, each of which is secured to the depending arm 109 of a toothed segment 110, and all of said segments being journaled on shaft 111. The teeth of each segment 110 mesh with the teeth of a pinion 112, and which latter is loosely mounted on shaft 113 that is supported in suitable bearings. Secured to each pinion 112 is a disc 114 provided on its periphery with printing characters running from zero to nine.

Pivotally mounted in the lower right-hand corner of housing 10 is one end of an arm 115, the free end of which occupies a position beneath the end of arm 90 that carries the cross bar 89, and projecting upwardly from the pivoted end of arm 115 is a pair of spaced arms 116 between which are journaled a pair of rollers 117 and 118. Fixed to the shaft of the upper roller 118 is a ratchet wheel 119 that is engaged by a pawl 120 that is pivotally mounted on the outer face of the pinion 121, and the teeth of which latter engage with the teeth of an arcuate rack bar 122, and which latter is concentric with the axis or pivotal point of the arms 116. Carried by the lower portions of arms 116 is an upright arm 123, and formed through the upper portion thereof is an opening 124 through which the printing characters on the discs 114 are adapted to project when roller 118 is forced against the upper end of said arm 123.

Journaled in suitable bearings above roller 118 is a shaft 125 on which is mounted a spool 126 of paper or thin cardboard in tape form. The web of this tape extends downwardly beneath the upper roller 118 and between said roller and the lower feed roller 117.

Briefly described, the operation of my improved calculating scale is as follows:

The article or product to be weighed and the total cost of which is to be calculated is placed on the scale platform 15, and following such action the weight of the article or product will be indicated by the pointer 22 on the graduated scale on disc 14. The operator or salesman now disengages the arm 64 from handle 57, swings said arm into an inclined position, as shown by dotted lines in Fig. 1, engages the upper end of said arm with spring latch 67, then presses the key or keys representing the cost or price per pound of the article placed on the scale platform, then moves handle 57 downward to perform certain operations hereinafter more fully set forth, and a portion of the tape from spool 126 will be delivered through an opening in the side wall of housing 10 adjacent to rollers 117–118, and which portion of tape has printed thereupon the total amount to be charged for the goods or products placed on the scale platform. Immediately after the handle 57 is pulled downward the total amount of the transaction will appear on the portions of the discs 100 that are visible through the openings 102 in the upper portion of housing 11.

The detailed operation of the computing scale is as follows:

Assuming that the parts of the computing scale are in their normal positions as illustrated in the various views of the drawings when platform 15 is moved downward by the weight of the goods placed thereon, the rear end of lever 16 is moved downward thereby pulling downward on rod 18, and through band 19 and wheel 20 shaft 21 will be rotated thereby moving counter 22 around the graduated scale on disc 14 to indicate the exact weight of the goods placed on the scale platform. The salesman now disengages the end of arm 64 from handle 57 and swings said arm upward into an inclined position so that its free end is engaged by spring catch 67, which action swings the cross bar 63 into an angular position, and through links 68 and sliding bars 69, plates 71 are clamped against rod 18 to firmly retain the same in its lowered position, and thus the stop 24 on said rod occupies a position a certain distance below cross bar 25. The salesman now presses inwardly on the key 53 that represents the price per pound to be charged for the product on the scale platform, and as said key is thus pressed the corresponding rod 51 is drawn forwardly thereby actuating the corresponding bell crank 50, rod 49, and trigger 47, with the result that the corresponding hook 44 will be thrown into engagement with the corresponding hook 40 on the forward end of the corresponding flexible band 39. Handle 57 is now engaged and moved downward thereby imparting corresponding movement to the frame comprising the vertically disposed rods 42 and cross bar 43 to which the hooks 44 are pivoted, and the engaged hook will draw downwardly upon the forward end of the engaged band 39, thereby rotating the entire series of price-proportionate discs 38 and the shaft 30 to which the same are connected a predetermined portion of the complete rotation, the distance of rotation being regulated by the diameter of the disc on which the actuated band is positioned. As a result of this rotation of shaft 30, pinions 29 engage teeth 28 of vertical bars 26, thereby moving the same downward until the cross bar 25 bears against collar 24 which serves as a stop to limit the further downward movement of the handle 57.

As the left-hand one of the members 42 is moved downward, as just described, the bifurcated lower end 80 of said member engages flange 79 on shaft 76, thereby imparting rotary motion thereto, and through pinion 78 and gear wheel 75, stud 74 and disc 81 are rotated a predetermined portion of a complete rotation, this rotation being a function of both the total weight and the cost per unit of weight, and being such as to bring certain of the slots 82, 83 and 84 into position beneath the row of lugs 88 on the bars 87, and following such action, cross bar 89 being movable by its described connections responsive to movement of handle 57 one bar of the unit series will swing downward a short distance as its lug enters one of the slots 82, one of the bars of the tens series will swing downward as its lug enters one of the recesses forming one of the curved slots 83, and one of the third series of bars which represent hundreds will swing downwardly as its lug enters one of the slots 84, it being understood that the dimensions of the respective lugs, whether uniform or varied, are such as to adapt each to cooperate with its corresponding slot, entering the same only when the rotation of the plate 81 brings said slot into a suitable position.

A bar 87 of the hundreds group may remain in one slot through 100 different positions of disc 81, in order to register units and tens from 1 to 99; and lug 88 of each tens bar may remain in the same slot through ten different positions of the disc 81, for similar reason.

It will be understood that the arrangement of the slots 82, 83 and 84 in plate 81 is such that, the selection of one bar of each series being dependent upon the position of disc 81, and the outermost slot of each series being employed to represent zero, the next slot representing "1", etc., when one bar of each series shall have dropped downwardly under the action of gravity or any applied force and by the movement of the respective lugs 88 into slots, the bars thus dropped represent the total amount to be charged for the goods placed on the scale platform. Obviously, if the goods being weighed are of relatively light weight and sell for a relatively low price per pound, the computed total to be indicated may be so low that less than three of the bars 87 will drop downwardly in the manner just described.

As certain of the bars 87 swing downward, under the action of the gravity or any applied force and to effect an indication of cost the corresponding bell cranks 96 will be variably depressed in the manner best shown in Fig. 10, and to an extent dependent upon the position of the selected bar with reference to the associated lever 96 thereby drawing downward on the flexible members 97 and actuating the corresponding arms 99 and in turn rotating the corresponding discs 100 to move the same into positions so that the numbers arranged on the faces of said discs will appear through the openings 102 in the upper portion of the housing of the machine, thereby showing the total cost or price of the goods placed on the scale platform. As bell cranks 96 are actuated the corresponding members 108 will be actuated to swing segment 110, thereby imparting rotary motion to the corresponding discs 114 through pinions 112, thereby setting up or positoning the proper printing characters on the edges of said discs, and which printing characters correspond with the total amount of the transaction.

The salesman now engages handle 57 and rotates the same and the shaft 55, and as a result of such movement the teeth of segment 58 will engage the teeth 59 of vertically movable bar 60 thereby swinging arm 94 on its fulcrum, and in turn swinging weighted arm 90 upon its fulcrum, and which latter movement moves the free end of arm 115 downward. Such movement swings the vertically disposed arm 116 toward the printing wheels, and as a result of such movement, pinion 121 will rotate by engagement with the teeth of arm 122 without imparting movement to roller 118, for during such movement, pawl 120 will ride over the teeth of ratchet wheel 119.

The tape on the face of roller 118 will be forced through opening 124 in vertical arm 123 into engagement with the printing characters on discs 114, thus having the total amount of the transaction printed on said tape, and on the return movement of arm 116 to its normal position, roller 118 will be rotated as a result of the engagement of the teeth of pinion 121 with the teeth of arm 122, and also the engagement of pawl 120 with the teeth of ratchet wheel 119 so that roller 118 will be rotated to feed that portion of the tape that has just been printed outwardly through the opening in the housing, and which printed portion of the tape may be removed by the salesman and delivered to the purchaser or retained as a record of the transaction.

The salesman now reversely rotates the handle 57 or shifts the same into its normal vertical position and elevates said handle to the upper end of slot 56, which action permits weighted arm 90 to elevate the arms 87 that were previously dropped, and permitting the printing mechanism to return to its normal position, and likewise permitting the indicating discs 100 to return to their normal positions.

The upward movement of the bifurcated lower end 80 of the left-hand arm 42 is effective in rotating disc 81 to its normal position, and after handle 57 has returned to its normal position, arm 64 is swung downward and re-engaged upon said handle which action releases the clamping members 71 from rod 18, and the latter will be elevated by the action of spiral spring 23 acting upon shaft 21.

When hooks 44, which were drawn downward on the previous operation, return to their normal positions, the weights 45 thereof will disengage said hooks from the engaged hooks 40, thereby releasing the clamping actions of the bands on the discs 38, and the entire series of discs will be returned to their normal positions by the action of the counterbalancing weights 36.

Thus it will be seen that I have provided a calculating scale that is effective in making a record of all transactions into which it enters, and the mechanism of said scale being arranged so as to calculate, indicate and record the total cost or price of the goods or products placed on the scale platform.

It will be understood that minor changes in size, form and construction of the various parts of my improved computing attachment for scales may be made and substituted for those herein shown and described without departing from the spirit of my invention, the scope of which is set forth in the appended claims.

I claim as my invention:

1. In a computing scale, a platform adapted to receive the articles to be weighed, a dial bearing a graduated scale, a pointer aranged for operation adjacent to said graduated scale, a connecting rod adapted to be depressed proportionately to the downward movement of the scale platform for operating said pointer, and manually operable means for clamping said pointer actuating member when the same has been moved downward by said scale platform.

2. In a computing scale, a platform adapted to receive the articles to be weighed, a dial bearing a graduated scale, a pointer arranged for operation adjacent to said graduated scale, a connecting rod adapted to be depressed proportionately to the downward movement of the scale platform for operating said pointer, manually operable means for clamping said pointer actuating member when the same has been moved downward by said scale platform, and means for locking said manually operable means in clamping position.

3. In a computing scale, a platform adapted to receive the goods to be weighed, means actuated by the downward movement of said platform for indicating the weight of goods placed on said platform, means comprising a stop on a rod connecting said platform and said indicator for calculating the total cost of the articles placed on the scale platform, key actuated means for controlling the operation of said calculating means, and means within the machine and under control of the calculating means for printing the total amount of each transaction upon a slip and delivering the same to the exterior of the housing of the machine.

4. In a computing scale, a platform adapted to receive the articles to be weighed, means for indicating the weight of the articles placed on said platform, means for calculating the total cost of the articles placed on said platform, the operation of which calculating means is controlled by the downward movement of the scale platform and which calculating means includes a horizontally rotatably mounted disc in the upper surface of which are formed three sets of slots, three sets of arms pivotally arranged above said disc, said arms having depending portions that are adapted to drop into said slots, and means controlled by said arms for indicating the total amount of each weighing and calculating operation.

5. In a computing scale, a platform adapted to receive the articles to be weighed, means for indicating the weight of the articles placed on said platform, means for calculating the total cost of the articles placed on said platform, the operation of which calculating means is controlled by the downward movement of the scale platform and which calculating means includes a rotatably mounted disc in the upper surface of which is formed three sets of slots, three sets of arms pivotally arranged above said disc, said arms having depending portions that are adapted to drop into said slots, means controlled by said arms for indicating the total amount of each weighing and calculating operation, and means for printing the total amount of each transaction on a strip of material and delivering the latter to the exterior of the housing of the computing scale.

6. In a computing scale, a platform that is adapted to receive the articles to be weighed, means actuated by said platform for indicating the weight of articles placed thereon, means for calculating the total cost price of each article placed on the scale platform, which means includes a horizontally rotatably mounted disc provided in its upper face with a plurality of sets of slots, a series of pivotally mounted arms arranged above each set of slots, said arms having depending portions that are adapted to enter said slots, and manually operable means for rotating said disc.

7. In a computing scale, a platform that is adapted to receive the articles to be weighed, means actuated by said platform for indicating the weight of articles placed thereon, means for calculating the total cost price of each article placed on the scale platform, which means includes a rotatably mounted disc provided in its upper face with a plurality of sets of slots, a series of pivotally mounted arms arranged above each set of slots, said arms having depending portions that are adapted to enter said slots, manually operable means for rotating said disc, and means controlled by the weight of an article placed on the scale platform for controlling the rotary motion imparted to said disc.

8. In a computing scale, a platform that is adapted to receive the articles to be weighed, means actuated by said platform for indicating the weight of articles placed thereon, means for calculating the total cost price of each article placed on the scale platform, which means includes a rotatably mounted disc provided in its upper face with a plurality of sets of slots, a series of pivotally mounted arms arranged above each set of slots, said arms having depending portions that are adapted to enter said slots, manually operable means for rotating said disc, means controlled by the weight of an article placed on the scale platform for controlling the rotary motion imparted to said disc, and means for printing the total amount of each transaction upon a strip of material and delivering the printed portion thereof to the exterior of the housing of the scale.

9. In a computing scale, a platform that is adapted to receive the articles to be weighed, means actuated by said platform for indicating the weight of articles placed thereon, means for calculating the total cost price of each article placed on the scale platform, which means includes a rotatably mounted disc provided in its upper face with a plurality of sets of slots, a series of pivotally mounted arms arranged above each set of slots, said arms having depending portions that are adapted to enter said slots, manually operable means for rotating said disc, means controlled by the weight of an article placed on the scale platform for controlling the rotary motion imparted to said disc, means for printing the total amount of each transaction upon a strip of material and delivering the printed portion thereof to the exterior of the housing of the scale, and means actuated by the downward movement of the arms over the slotted disc for indicating the total amount of each weighing and calculating transaction.

10. In a computing scale, a platform adapted to receive the articles to be weighed, means for indicating the weight of the articles placed on said platform, means for calculating the total cost of the articles placed on said platform, and which calculating means includes a rotatably mounted disc provided in its upper face and adjacent to its outer edge with a series of grooves that are inclined slightly with respect to radial lines on said disc, there being a series of arcuate grooves formed in the face of said disc inside the first mentioned series of grooves, there being a third series of arcuate grooves formed in the top of said disc inside the second set of grooves, and a series of arms pivotally arranged above said disc, which arms are divided into three sets, and said arms having depending portions that are adapted to drop into the grooves in said disc.

11. In a computing scale, a platform adapted to receive the articles to be weighed, means for indicating the weight of the articles placed on said platform, means for calculating the total cost of the articles placed on said platform, the operation of which calculating means is controlled by the downward movement of the scale platform and which calculating means includes a rotatably mounted disc in the upper surface of which is formed three sets of slots, three sets of arms pivotally arranged above said disc, said arms having depending portions that are adapted to drop into said slots, manually manipulative means for controlling the degree of rotation of said disc and the position of the slots therein, and means controlled by said arms for indicating the total amount of each weighing and calculating operation.

12. In a computing scale, a platform adapted to receive the articles to be weighed, means for indicating the weight of the articles placed on said platform, means for calculating the total cost of the articles placed on said platform, the operation of which calculating means is controlled by the downward movement of the scale platform and which calculating means includes a rotatably mounted disc in the upper surface of which is formed three sets of slots, three sets of
arms pivotally arranged above said disc, said
arms having depending portions that are
adapted to drop into said slots, means controlled by said arms for indicating the total
amount of each weighing and calculating
operation, and gravity actuated means for
elevating those arms that have dropped as a
result of movement of their depending portions into certain of the slots in said disc.

13. In a computing scale, a platform
adapted to receive the articles to be weighed,
means for indicating the weight of the articles placed on said platform, means for calculating the total cost of the articles placed
on said platform, the operation of which
calculating means is controlled by the downward movement of the scale platform and
which calculating means includes a rotatably
mounted disc in the upper surface of which
is formed three sets of slots, three sets of
arms pivotally arranged above said disc, said
arms having depending portions that are
adapted to drop into said slots, manually
manipulative means for controlling the degree of rotation of said disc and the position
of the slots therein, means controlled by said
arms for indicating the total amount of each
weighing and calculating operation, and
gravity actuated means for elevating those
arms that have dropped as a result of movement of their depending portions into certain of the slots in said disc.

14. In a computing scale, a platform
adapted to receive the articles to be weighed,
means for indicating the weight of the articles placed on said platform, means for calculating the total cost of the articles placed
on said platform, means for indicating the
total cost of the articles placed on said platform, manually operable means for controlling the operation of said calculating means
and the total cost indicating means, and
manually manipulative means for controlling the operation of said manually operable
means, said calculating means comprising a
slotted disc whose rotation is a function of
both the weight and the cost per unit of
weight.

15. In a computing scale, a platform
adapted to receive the articles to be weighed,
means for indicating the weight of the articles placed on said platform, means for calculating the total cost of the articles placed
on said platform, means for indicating the
total cost of the articles placed on said platform, manually operable means for controlling the operation of said calculating means
and the total cost indicating means, manually manipulative means for controlling the
operation of said manually operable means,
and means for restoring the parts to their
normal positions after each weighing, calculating, and indicating operation, said calculating means comprising a slotted disc
whose rotation is a function of both the
weight and the cost per unit of weight, and
said slotted disc being adapted to cooperate
selectively with pivoted bars bearing lugs.

16. In a computing scale, a platform
adapted to receive the articles to be weighed,
means for indicating the weight of the articles placed on said platform, means for
calculating the total cost of the articles
placed on said platform, means operated
by bell-cranks and flexible connecting members for indicating the total cost of the
articles placed on said platform, manually
operable means for controlling the operation of said calculating means and the total
cost indicating means, manually manipulative means for controlling the operation of
said manually operable means, and means
for printing the total amount of each transaction on a strip of material and delivering
the latter to the exterior of the housing of
the computing scale.

17. In a computing scale, a platform
adapted to receive the articles to be
weighed, means for indicating the weight
of the articles placed on said platform,
means for calculating the total cost of
the articles placed on said platform,
means operated by bell-cranks variably depressed for indicating the total cost of the
articles placed on said platform, manually
operable means for controlling the operation
of said calculating means and the total cost
indicating means, manually manipulative
means for controlling the operation of said
manually operable means, means for printing the total amount of each transaction on a
strip of material and delivering the latter
to the exterior of the housing of the computing scale, and means for restoring the
parts to their normal positions after each
weighing, calculating, indicating, and printing operation.

18. In a computing scale, a substantially
L-shaped housing, a platform arranged
above the horizontal portion of said housing and adapted to receive articles to be
weighed, means on the upper part of the
vertical portion of the housing and actuated
by the weight of articles placed on the platform for indicating the weight of said articles, and means within said L-shaped housing for calculating the total cost of the articles placed on said platform, said calculating means comprising a slotted disc whose
rotation is a function of both the weight and
the cost per unit of weight and said slotted
disc being adapted to cooperate with members which actuate a cost indicator.

19. In a computing scale, a substantially
L-shaped housing, a platform arranged
above the horizontal portion of said housing
and adapted to receive articles to be weighed,
means on the upper part of the vertical portion of the housing and actuated by the weight of articles placed on the platform for indicating the weight of said articles, means within said L-shaped housing for calculating the total cost of the articles placed on said platform, said calculating means comprising a slotted disc whose rotation is a function of both the weight and the cost per unit of weight, and duplicate means within the upper part of the vertical portion of the housing for indicating at two points the total cost of the articles placed on said platform.

20. In a computing scale, a substantially L-shaped housing, a platform arranged above the horizontal portion of said housing and adapted to receive articles to be weighed, means on the upper part of the vertical portion of the housing and actuated by the weight of articles placed on the platform for indicating the weight of said articles, means within said L-shaped housing for calculating the total cost of the articles placed on said platform, said calculating means comprising a slotted disc whose rotation is a function of both the weight and the cost per unit of weight, duplicate means within the upper part of the vertical portion of the housing for indicating at two points the total cost of the articles placed on said platform, and means controlled by the movement of pivoted bars movable relative to said disc for printing the total amount of each transaction on a strip of material and delivering the latter to the exterior of said housing.

21. In a computing scale comprising a rod, the extent of whose movement is dependent upon a weight, means for clamping said rod after its movement, a stop whose position is dependent upon the extent of movement of said rod, a series of price-proportionate elements differing in diameter to correspond with differences in price per unit of weight, means for a selection among said price-proportionate elements, and means for indicating a total price, said last mentioned means comprising an element whose extent of movement is determined by the position of said stop, and an element whose rotation is dependent upon both the extent of such movement and the dimensions of a selected price-proportionate element.

In testimony whereof I have signed my name to this specification.

McKINNEY PHELPS.